(12) United States Patent
Hong et al.

(10) Patent No.: US 10,564,997 B2
(45) Date of Patent: Feb. 18, 2020

(54) COMPUTING SYSTEM FOR SECURELY EXECUTING A SECURE APPLICATION IN A RICH EXECUTION ENVIRONMENT

(71) Applicant: SAMSUNG ELECTRONICS CO., LTD., Suwon-si, Gyeonggi-Do (KR)

(72) Inventors: Sung-Min Hong, Yongin-si (KR); Woo-Hyung Chun, Yongin-si (KR); Young-Seok Kim, Suwon-si (KR); Sung-Jae Lee, Seongnam-si (KR); Eun-Ok Jo, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 227 days.

(21) Appl. No.: 15/683,889

(22) Filed: Aug. 23, 2017

(65) Prior Publication Data

US 2018/0129525 A1    May 10, 2018

(30) Foreign Application Priority Data

Nov. 9, 2016 (KR) ........................ 10-2016-0148716

(51) Int. Cl.
*G06F 9/455* (2018.01)
*G06F 9/48* (2006.01)
(Continued)

(52) U.S. Cl.
CPC .......... *G06F 9/45558* (2013.01); *G06F 9/455* (2013.01); *G06F 9/45533* (2013.01); *G06F 9/48* (2013.01); *G06F 9/485* (2013.01); *G06F 9/4806* (2013.01); *G06F 9/4843* (2013.01); *G06F 9/4881* (2013.01); *G06F 9/50* (2013.01); *G06F 9/5005* (2013.01); *G06F 9/5011* (2013.01);
(Continued)

(58) Field of Classification Search
CPC .. G06F 9/455; G06F 9/45533; G06F 9/45558; G06F 2009/4557; G06F 2009/45579; G06F 2009/45583; G06F 2009/45587; G06F 2009/45595; G06F 9/48; G06F 9/4806; G06F 9/4843; G06F 9/485; G06F 9/4881; G06F 9/50; G06F 9/5005; G06F 9/5011; G06F 9/5027; G06F 9/5061; G06F 9/5077
See application file for complete search history.

(56) References Cited

U.S. PATENT DOCUMENTS 8,327,353 B2   12/2012   Traut
8,819,675 B2    8/2014   Uehara et al.
(Continued)

FOREIGN PATENT DOCUMENTS

JP   5532793 B   5/2014

*Primary Examiner* — Charles M Swift
(74) *Attorney, Agent, or Firm* — Volentine, Whitt & Francos, PLLC

(57) ABSTRACT

A computing system includes a processor that operates a plurality of virtual machines in which a plurality of operating systems are respectively executed. The processor executes a hypervisor that groups the plurality of virtual machines into a normal virtual machine group and a privilege virtual machine group, and that controls hardware accesses requested by the normal virtual machine group and the privilege virtual machine group. The processor executes a normal application in the normal virtual machine group, and executes a secure application in the privilege virtual machine group.

20 Claims, 12 Drawing Sheets

(51) Int. Cl.
  *G06F 9/50* (2006.01)
  *G06F 21/53* (2013.01)
  *G06F 12/1009* (2016.01)
  *G06F 13/16* (2006.01)

(52) U.S. Cl.
  CPC .......... *G06F 9/5027* (2013.01); *G06F 9/5061* (2013.01); *G06F 9/5077* (2013.01); *G06F 12/1009* (2013.01); *G06F 13/16* (2013.01); *G06F 21/53* (2013.01); *G06F 2009/4557* (2013.01); *G06F 2009/45579* (2013.01); *G06F 2009/45583* (2013.01); *G06F 2009/45587* (2013.01); *G06F 2009/45595* (2013.01); *G06F 2212/1052* (2013.01); *G06F 2212/152* (2013.01)

(56) References Cited

U.S. PATENT DOCUMENTS

| | | |
|---|---|---|
| 8,938,782 B2 | 1/2015 | Sawhney et al. |
| 9,117,091 B2 | 8/2015 | Tucker |
| 2011/0314467 A1* | 12/2011 | Pearson ................... G06F 9/455 718/1 |
| 2012/0054744 A1* | 3/2012 | Singh ..................... G06F 21/53 718/1 |
| 2012/0255003 A1 | 10/2012 | Sallam |
| 2014/0282543 A1* | 9/2014 | Ignatchenko ....... G06F 9/45558 718/1 |
| 2014/0317737 A1 | 10/2014 | Shin et al. |
| 2015/0244710 A1 | 8/2015 | Koster et al. |
| 2015/0277949 A1* | 10/2015 | Loh .................... G06F 9/45558 711/152 |
| 2015/0304716 A1* | 10/2015 | Sanchez-Leighton ...................... G06F 21/53 725/31 |
| 2015/0319160 A1 | 11/2015 | Ferguson et al. |
| 2015/0332048 A1* | 11/2015 | Mooring ............... G06F 21/567 726/1 |
| 2016/0162316 A1* | 6/2016 | King .................. G06F 9/45558 718/1 |
| 2016/0259731 A1* | 9/2016 | Evans ..................... G06F 12/10 |
| 2017/0039080 A1* | 2/2017 | Chadha ................. G06F 16/183 |
| 2018/0024944 A1* | 1/2018 | Zeng .................. G06F 12/1009 |

\* cited by examiner

FIG. 6A

| NORMAL ACCESS RULE TABLE | | |
|---|---|---|
| PI | RAPI | WAPI |
| ⋮ | ⋮ | ⋮ |
| X | 1 | 1 |
| ⋮ | ⋮ | ⋮ |
| Y | 0 | 1 |
| ⋮ | ⋮ | ⋮ |
| Z | 0 | 0 |
| ⋮ | ⋮ | ⋮ |

FIG. 6B

| PRIVILEGE ACCESS RULE TABLE | | |
|---|---|---|
| PI | RAPI | WAPI |
| ⋮ | ⋮ | ⋮ |
| X | 0 | 0 |
| ⋮ | ⋮ | ⋮ |
| Y | 1 | 0 |
| ⋮ | ⋮ | ⋮ |
| Z | 1 | 1 |
| ⋮ | ⋮ | ⋮ |

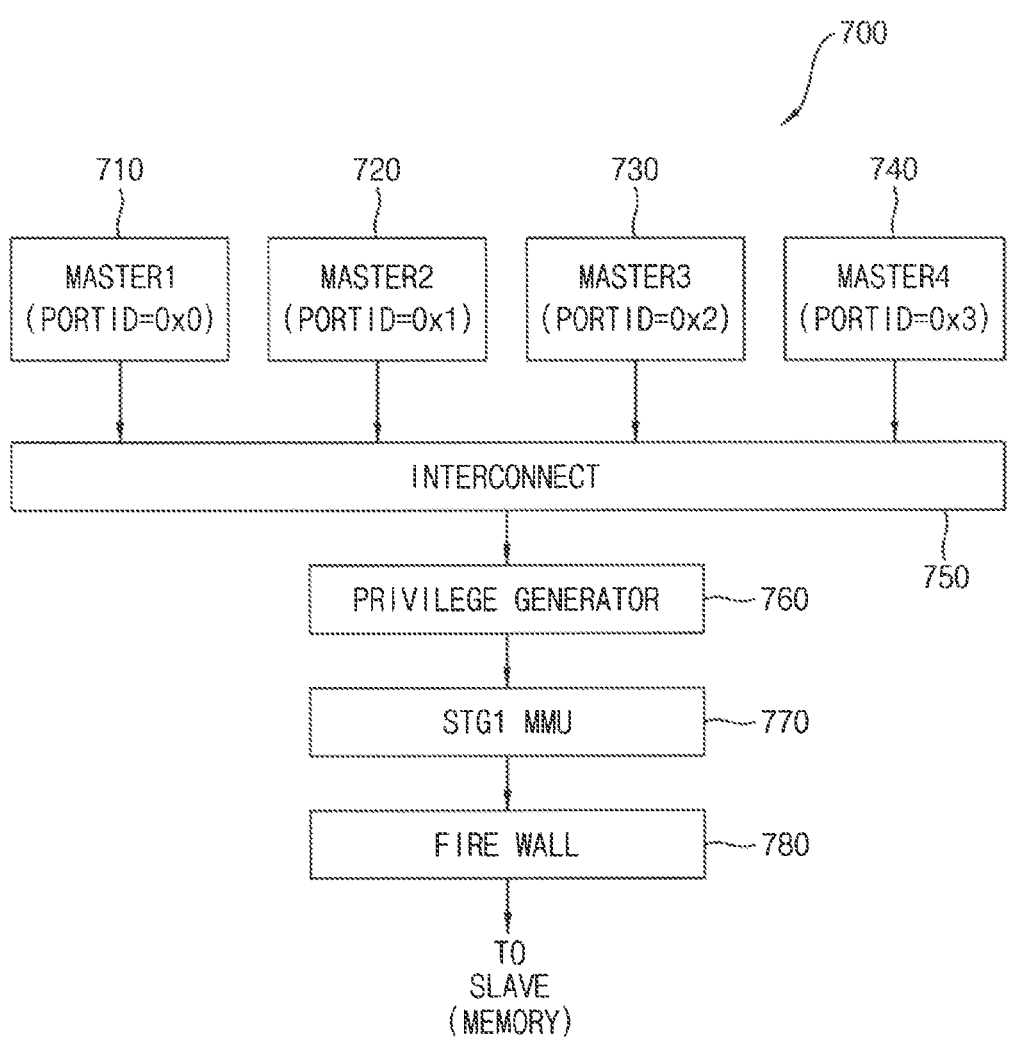

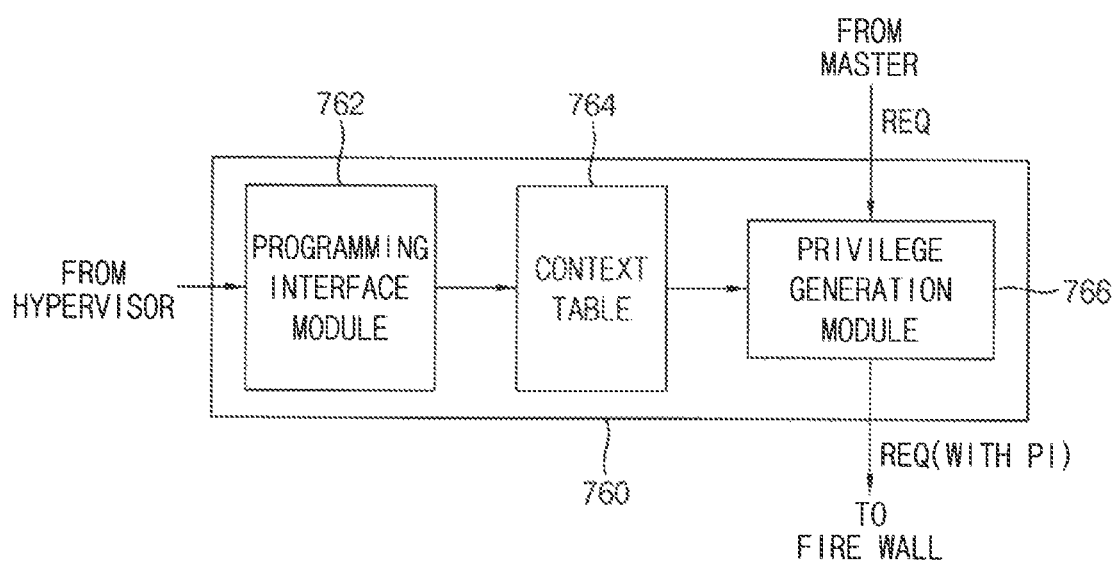

COMPUTING SYSTEM FOR SECURELY EXECUTING A SECURE APPLICATION IN A RICH EXECUTION ENVIRONMENT

CROSS-REFERENCE TO RELATED APPLICATIONS

This U.S. non-provisional application claims the benefit of priority under 35 U.S.C. § 119 to Korean Patent Application No. 10-2016-0148716 filed on Nov. 9, 2016 in the Korean Intellectual Property Office (KIPO), the entire content of which is incorporated by reference herein in its entirety.

BACKGROUND

Example embodiments of the present inventive concepts relate to computing systems, and more particularly to computing systems for securely executing secure applications in rich execution environments.

In order to securely execute a secure application, a technique providing a trusted execution environment (TEE), such as an ARM TrustZone technique, has been developed. In this technique, a normal application is executed in a rich execution environment (REE) or a normal world, the secure application is executed in the TEE or a secure world that is isolated from the REE or the normal world, and thus it is ensured that the secure application is securely executed. However, a complicated secure application cannot be executed in either the TEE or in the normal world.

SUMMARY

Some example embodiments provide a computing system that securely executes a secure application in a rich execution environment.

According to example embodiments, a computing system includes a processor. The processor operates a plurality of virtual machines in which a plurality of operating systems are respectively executed. The processor executes a hypervisor that groups the plurality of virtual machines into a normal virtual machine group and a privilege virtual machine group, and that controls hardware accesses requested by the normal virtual machine group and the privilege virtual machine group. The processor executes a normal application in the normal virtual machine group, and executes a secure application in the privilege virtual machine group.

According to example embodiments, a computing system includes a processor. The processor operates a plurality of virtual machines in which a plurality of operating systems are respectively executed. The processor executes a hypervisor that controls hardware accesses requested by the plurality of virtual machines. The processor executes a normal application in a first one of the plurality of virtual machines, and executes a secure application in a second one of the plurality of virtual machines.

According to example embodiments, a computing system includes a processor, and provides a rice execution environment (REE) and a trusted execution environment (TEE). The processor operates a plurality of virtual machines in which a plurality of rich operating systems are respectively executed in the REE, and executes a secure operating system in the TEE. The processor executes, in the REE, a hypervisor that groups the plurality of virtual machines into a normal virtual machine group and a privilege virtual machine group, and that controls hardware accesses requested by the normal virtual machine group and the privilege virtual machine group. The processor executes a first secure application in the TEE, executes a normal application in the normal virtual machine group of the REE, and executes a second secure application in the privilege virtual machine group of the REE, wherein the second secure application requires a data throughput greater than a data throughput required by the first secure application in the TEE.

As described above, the computing system according to example embodiments may execute the normal application in the normal virtual machine group, may execute the secure application in the privilege virtual machine group, and may block an access request from the normal virtual machine group for at least one hardware resource allocated to the privilege virtual machine group, thereby securely executing the secure application in the REE.

Further, the computing system according to example embodiments may use intermediate physical addresses of the virtual machine groups as physical addresses of a memory device without an address translation, thereby reducing a virtualization overhead.

According to other example embodiments, a system comprises: a memory device including a plurality of physical pages; a processor, wherein the processor is configured: to operate a plurality of virtual machines in which a plurality of operating systems are respectively executed; to execute a hypervisor that controls hardware accesses requested by the plurality of virtual machines; to execute a normal application in a first one of the plurality of virtual machines; and to execute a secure application in a second one of the plurality of virtual machines; one or more master devices; and one or more hardware firewalls arranged between the one or more master devices and the memory device, wherein the processor and the one or more master devices are each configured to access data in the memory device.

BRIEF DESCRIPTION OF THE DRAWINGS

Illustrative, non-limiting example embodiments will be more clearly understood from the following detailed description taken in conjunction with the accompanying drawings.

FIG. 6A is a diagram illustrating an example of a normal access rule table included in a hardware firewall of FIG. 4, FIG. 6B is a diagram illustrating an example of a privilege access rule table included in a hardware firewall of FIG. 4.

FIG. 7 is a block diagram illustrating a portion of a computing system according to example embodiments.

FIG. 8 is a block diagram illustrating a hardware privilege generator included in a computing system according to example embodiments.

FIG. 9 is a diagram illustrating an example of a context table included in a hardware privilege generator of FIG. 8.

DETAILED DESCRIPTION

Figure 1:
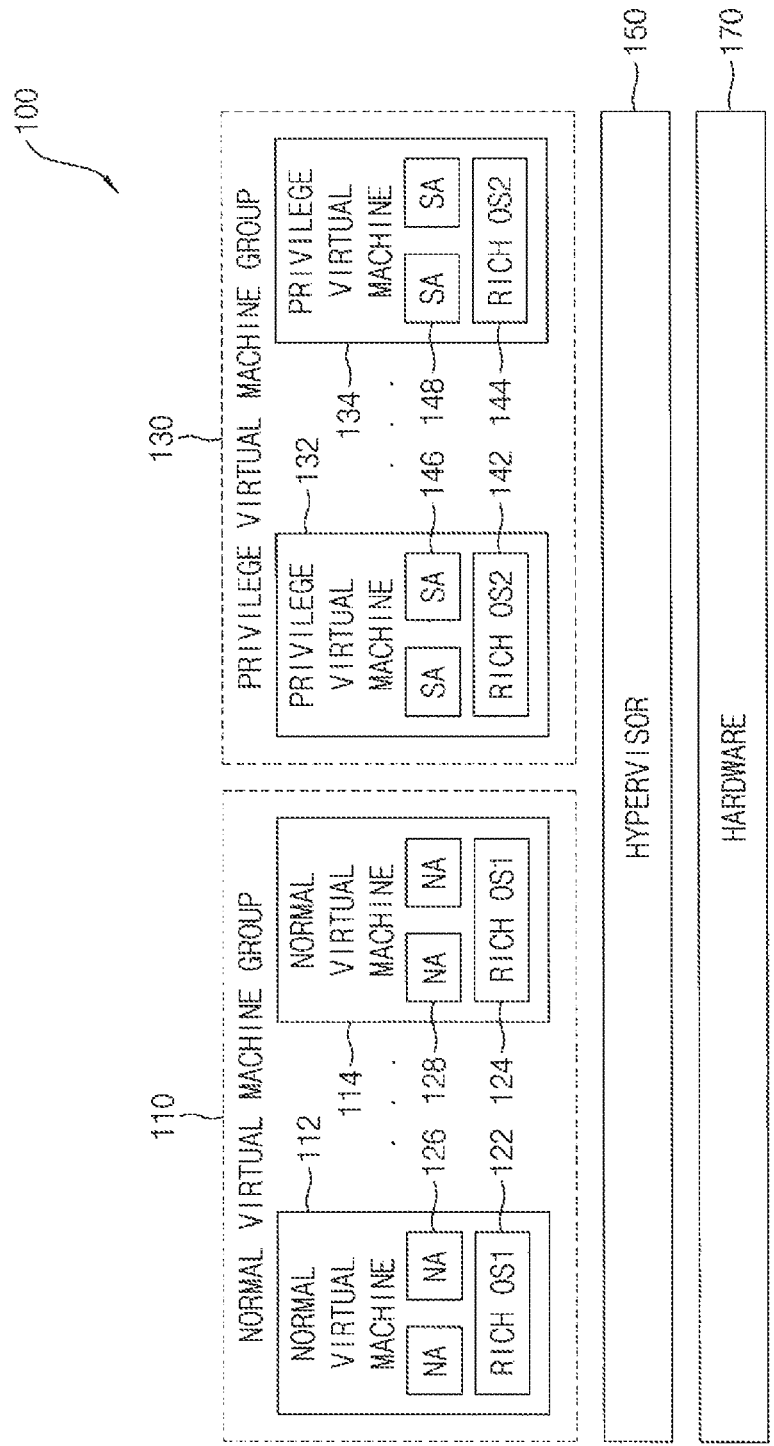
FIG. 1 is a block diagram for describing a software architecture of a computing system according to example embodiments.

FIG. 1 is a block diagram for describing a software architecture of a computing system according to example embodiments.

Referring to FIG. 1, a computing system 100 includes hardware 170 including a processor. Computing system 100 (or the processor of computing system 100) may operate a plurality of virtual machines 112, 114, 132 and 134, and may execute a plurality of operating systems 122, 124, 142 and 144 in the plurality of virtual machines 112, 114, 132 and 134, respectively. Computing system 100 (or the processor of computing system 100) may execute a hypervisor 150 that groups the plurality of virtual machines 112, 114, 132 and 134 into a normal virtual machine group 110 and a privilege virtual machine group 130, and that controls hardware accesses (or accesses for hardware 170) requested by normal virtual machine group 110 and privilege virtual machine group 130.

Hypervisor 150 may be a software or a logical platform for executing or running the plurality of operating systems 122, 124, 142 and 144 at the same time as each other in computing system 100, and may be referred to as a virtual machine monitor (VMM). Hypervisor 150 may group the plurality of virtual machines 112, 114, 132 and 134 into normal virtual machine group 110 and privilege virtual machine group 130. Each virtual machine 112, 114, 132 and 134 may be classified as a normal virtual machine 112 and 114 in normal virtual machine group 110 or a privilege virtual machine 132 and 134 in privilege virtual machine group 130. That is, hypervisor 150 may manage at least one virtual machine 112 and 114 in normal virtual machine group 110 as normal virtual machine 112 and 114, and may manage at least one virtual machine 132 and 134 in privilege virtual machine group 130 as privilege virtual machine 132 and 134. For example, hypervisor 150 may classify resources of hardware 170 of computing system 100 into hardware resources accessible only by normal virtual machines 112 and 114, hardware resources accessible only by privilege virtual machines 132 and 134, and/or hardware resources accessible by both of normal virtual machines 112 and 114 and privilege virtual machines 132 and 134, and may manage normal virtual machine group 110 (or normal virtual machines 112 and 114) and privilege virtual machine group 130 (or privilege virtual machines 132 and 134) such that each of virtual machines 112, 114, 132 and 134 accesses only the hardware resources that are permitted for it to access.

To ensure isolation between normal virtual machine group 110 and privilege virtual machine group 130, hypervisor 150 may control the accesses for hardware 170 requested by normal virtual machine group 110 and privilege virtual machine group 130. In some example embodiments, hypervisor 150 may selectively block a hardware access request generated in normal virtual machine group 110 (e.g., by using a hardware firewall 400 of FIG. 4) such that at least one hardware resource allocated only to privilege virtual machine group 130 is not accessed by normal virtual machine group 110. For example, the at least one hardware resource may include at least one physical page of a memory device included in computing system 100. That is, hypervisor 150 may selectively block an access request for the memory device generated in normal virtual machine group 110 (e.g., by using a hardware firewall 400 of FIG. 4) such that at least one physical page allocated only to privilege virtual machine group 130 is not accessed by normal virtual machine group 110. However, the hardware resource may not be limited to the physical page of the memory device, and may be any hardware resource included in computing system 100.

At least one normal virtual machine 112 and 114 in normal virtual machine group 110 and at least one privilege virtual machine 132 and 134 in privilege virtual machine group 130 may be emulations of computer systems, and the plurality of operating systems 122, 124, 142 and 144 may be executed in virtual machines 112, 114, 132 and 134, respectively. The plurality of operating systems 122, 124, 142 and 144 may be rich operating systems executed in a rich execution environment (REE). For example, each operating system 122, 124, 142 and 144 may be an Android operating system (OS), an Android Wear OS, a Symbian OS, a Windows OS, a Tizen OS, etc. Thus, normal virtual machines 112 and 114 and privilege virtual machines 132 and 134 in which the rich operating systems are executed may be able to execute a complicated application or a heavy application. However, in some example embodiments, operating systems 142 and 144 executed in privilege virtual machine 132 and 134 may have enhanced security compared with operating systems 122 and 124 executed in normal virtual machine 112 and 114.

Computing system 100 (or the processor of computing system 100) may execute one or more normal applications 126 and 128 in normal virtual machine group 110 (or in at least one normal virtual machine 112 and 114 in normal virtual machine group 110), and may execute one or more secure applications 146 and 148 in privilege virtual machine group 130 (or in at least one privilege virtual machine 132 and 134 in privilege virtual machine group 130). Since hypervisor 150 blocks an access request for at least one hardware resource allocated only to privilege virtual machine group 130 (e.g., by using a hardware firewall 400 of FIG. 4) when the access request is generated in normal virtual machine group 110, or since hypervisor 150 blocks an access request for a physical (memory) page allocated only to secure applications 146 and 148 executed in privilege virtual machine group 130 (e.g., by using a hardware firewall 400 of FIG. 4) when the access request is generated by normal application 126 or 128 executed in normal virtual machine group 110, secure applications 146 and 148 may be securely executed in the REE where rich operating systems 142 and 144 are operated.

As described above, computing system 100 according to example embodiments may execute normal applications 126 and 128 in normal virtual machine group 110, may execute secure applications 146 and 148 in privilege virtual machine group 130, and may block the access request from normal virtual machine group 110 for at least one hardware resource allocated to privilege virtual machine group 130, thereby securely executing secure applications 146 and 148 in the REE.

Figure 2:
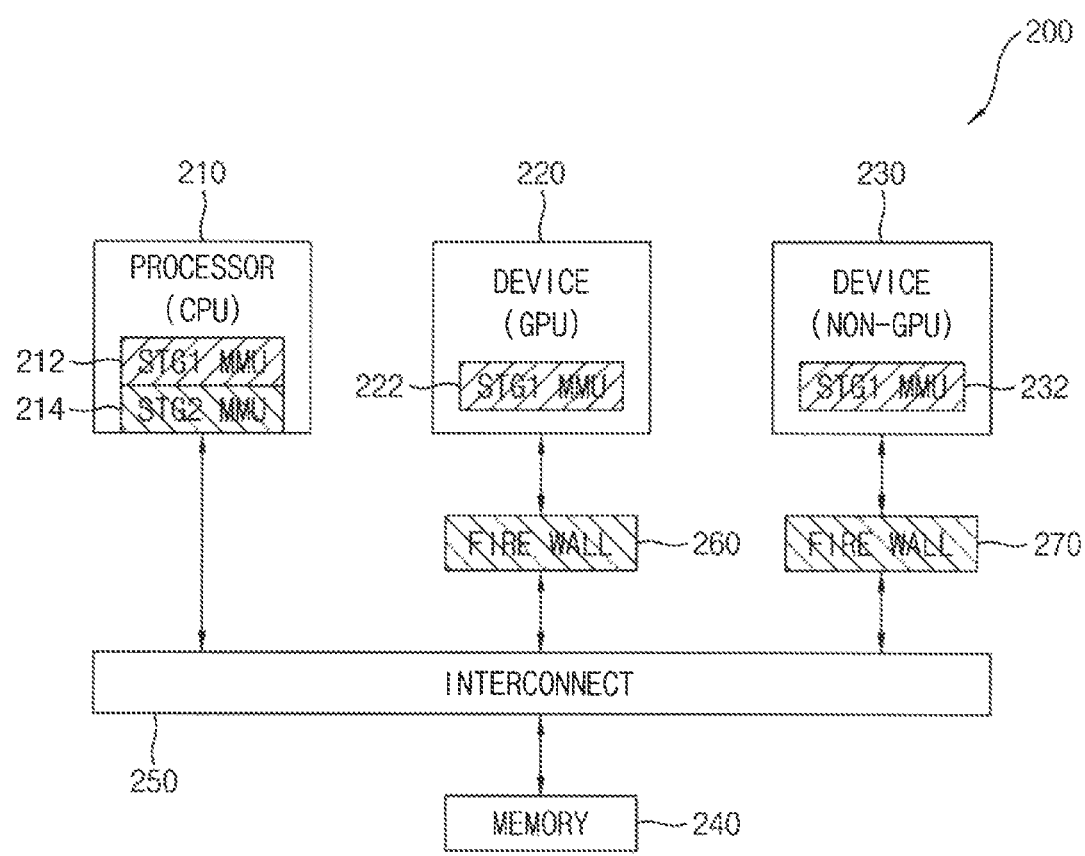
FIG. 2 is a block diagram for describing a hardware architecture of a computing system according to example embodiments.
Figure 3:
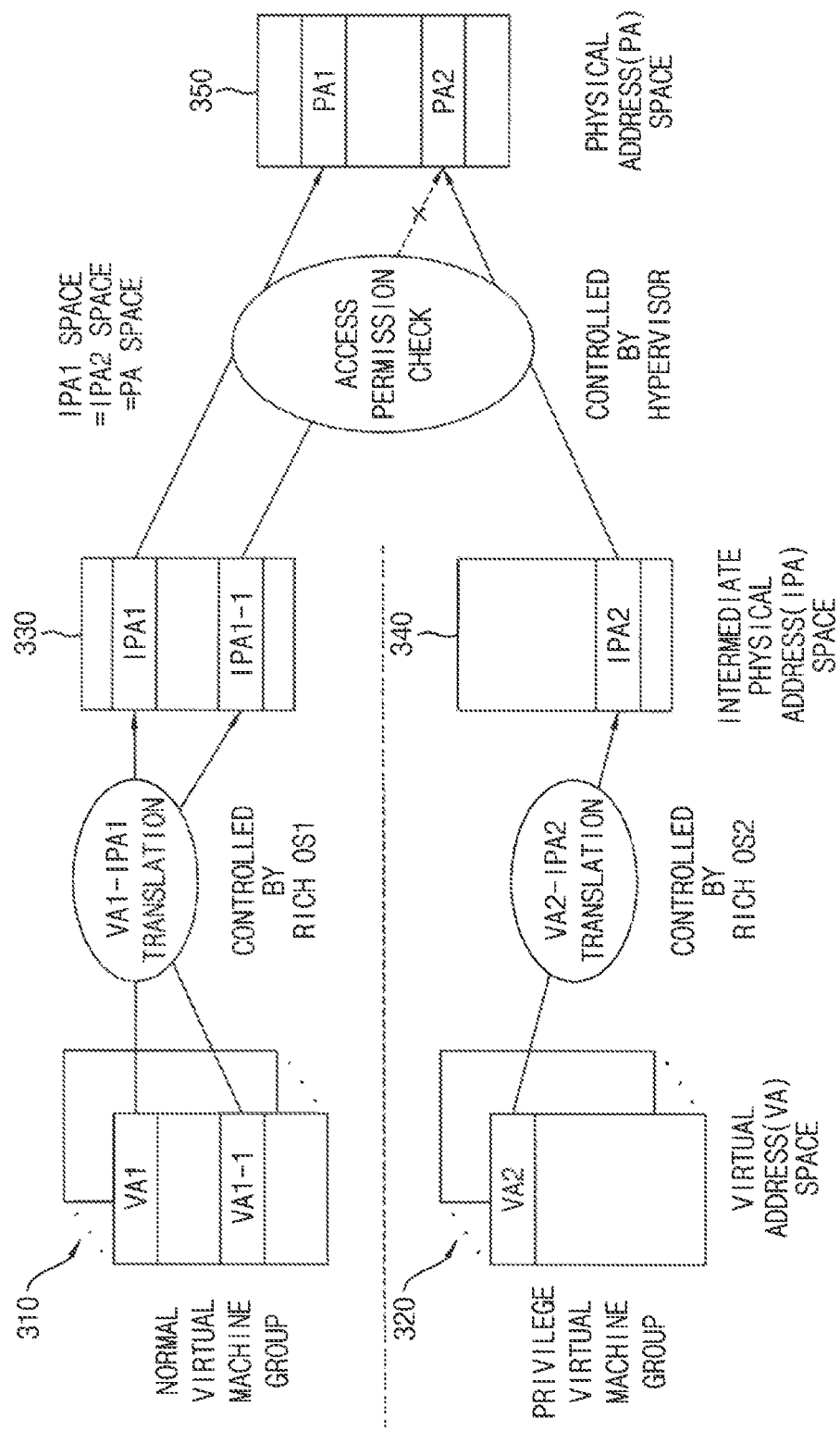
FIG. 3 is a diagram for describing an example of a memory address translation in a computing system according to example embodiments.

FIG. 2 is a block diagram for describing a hardware architecture of a computing system according to example embodiments, and FIG. 3 is a diagram for describing an example of a memory address translation in a computing system according to example embodiments.

Referring to FIG. 2, a computing system 200 may include a processor 210, devices 220 and 230, a memory device 240, an interconnect 250 and hardware firewalls 260 and 270. Computing system 200 may be any computing system requiring an execution of a secure application, such as a smart phone, a mobile phone, a tablet computer, a laptop computer, a personal computer, an MP3 player, a personal digital assistants (PDA), a portable multimedia player (PMP), a digital TV, a digital camera, portable game console, etc.

Processor 210 may control an overall operation of computing system 200. In some example embodiments, processor 210 may be a central processing unit (CPU), an application processor (AP), a mobile processor, or the like. In some example embodiments, processor 210 may execute a normal virtual machine group including at least one normal virtual machine, a privilege virtual machine group including at least one privilege virtual machine, and a hypervisor. In some example embodiments, processor 210 may include a stage-1 memory management unit (STG1 MMU) 212 and a stage-2 memory management unit (STG2 MMU) 214. The STG1 MMU 212 may be controlled by operating systems that are operated in a first privilege level or an exception level-1 (EL1), and the STG2 MMU 214 may be controlled by the hypervisor that is operated in a second privilege level or an exception level-2 (EL2) having a higher privilege than the privilege level or the EL1.

Devices 220 and 230 may include a graphics processing unit (GPU) and/or a non-GPU 230. For example, non-GPU 230 may include a hardware accelerator, a display device, an external subsystem, etc. In some example embodiments, devices 220 and 230 may include STG1 MMUs 222 and 232, respectively.

Processor 210 may be connected to a memory device 240 through interconnect 250, and devices 220 and 230 may be connected to memory device 240 through hardware firewalls 260 and 270 and interconnect 250. Memory device 240 may serve as a main memory of computing system 200. In some example embodiments, memory device 240 may be a volatile memory device, such as a dynamic random access memory (DRAM) device, a static random access memory (SRAM) device, etc.

Processor 210 and/or devices 220 and 230 may operate as masters that output access requests for a hardware (or a slave) included in computing system 200. For example, processor 210 and/or devices 220 and 230 may output an access request for memory device 240 generated in the normal virtual machine group or the privilege virtual machine group. Operating systems executed in the normal virtual machine group and the privilege virtual machine group may provide virtual memories, and the access request for memory device 240 generated in the normal virtual machine group or the privilege virtual machine group may include a virtual address in a virtual address space. Further, the operating systems executed in the normal virtual machine group and the privilege virtual machine group may manage intermediate physical address spaces, respectively, and the access request including the virtual address may be translated into an access request including an intermediate physical address in the intermediate physical address spaces by STG1 MMUs 212, 222 and 232 controlled by the operating systems.

In a conventional computing system operating a plurality of virtual machines, the plurality of virtual machines manage different physical address spaces, and a hypervisor translates an intermediate physical address in one of the different physical address spaces into an actual physical address of a memory device by using a STG2 MMU. In this case, the STG2 MMU may rapidly perform the address translation using a translation lookaside buffer (TLB) that stores translation information. However, in a case where desired translation information does not exist in the TLB, the STG2 MMU should access a page table included in the memory device, and thus the address translation cannot be rapidly performed. That is, the conventional computing system has a virtualization overhead in operating the plurality of virtual machines.

However, in computing system 200 according to example embodiments, the normal virtual machine group (or normal virtual machines) and the privilege virtual machine group (or privilege virtual machines) manage intermediate physical address spaces that are the same as an actual physical address space of memory device 240. Accordingly, the hypervisor may use the intermediate physical address as an actual physical address of memory device 240 without the address translation for the intermediate physical address, and the hypervisor may control STG2 MMU 214 and hardware firewalls 260 and 270 to check only whether each virtual machine group (or each virtual machine) is permitted to access a physical page of memory device 240 having the physical address. For example, the hypervisor may perform an access permission check on an access request output from processor 210 by using the STG2 MMU 214, may perform an access permission check on an access request output from device 220 by using hardware firewall 260, and may perform an access permission check on an access request output from device 230 by using hardware firewall 270. As described above, the hypervisor of computing system 200 according to example embodiments may use the intermediate physical address as the actual physical address of memory device 240 without the address translation for the intermediate physical address, thereby minimizing the virtualization overhead.

For example, as illustrated in FIG. 3, an operating system executed in each normal virtual machine included in the normal virtual machine group may provide virtual memories having a first virtual address space 310, and a first access request for memory device 240 generated in the normal virtual machine group (or in each normal virtual machine included in the normal virtual machine group) may include a first virtual address VA1 in first virtual address space 310. The operating system of the normal virtual machine group (or each normal virtual machine included in the normal virtual machine group) may control STG1 MMUs 212, 222 and 232 to translate the first virtual address VA1 into a first intermediate physical address IPA1 in a first intermediate physical address space 330. Further, an operating system executed in each privilege virtual machine included in the privilege virtual machine group may provide virtual memories having a second virtual address space 320, and a second access request for memory device 240 generated in the privilege virtual machine group (or in each privilege virtual machine included in the privilege virtual machine group) may include a second virtual address VA2 in second virtual address space 320. The operating system of the privilege virtual machine group (or each privilege virtual machine included in the privilege virtual machine group) may control STG1 MMUs 212, 222 and 232 to translate the second virtual address VA2 into a second intermediate physical address IPA2 in a second intermediate physical address space 340. Here, each of first intermediate physical address space 330 of the normal virtual machine group and second intermediate physical address space 340 of the privilege virtual machine group may be the same as a physical address space 350 of memory device 240. That is, intermediate physical addresses IPA1, IPA1-1 and IPA2 may be used, without translation, as physical addresses PA1 and PA2 in physical address space 350.

With respect to the first access request including the first intermediate physical address IPA1 generated in the normal virtual machine group, the first intermediate physical address IPA1 may be used as a first physical address PA1 in physical address space 350 of memory device 240, and the hypervisor may control STG2 MMU 214 or hardware firewalls 260 and 270 to selectively block the first access request based on access permission information of the normal virtual machine group for a physical page of memory device 240 having the first physical address PAL Thus, the hypervisor may control STG2 MMU 214 or hardware firewalls 260 and 270 to block an access request from the normal virtual machine group which includes a physical address corresponding to a physical page of memory device 240 that is allocated to the privilege virtual machine group. For example, in a case where an access request having a virtual address VA1-1 is generated in the normal virtual machine group, and the virtual address VA1-1 of the access request is translated into an intermediate physical address IPA1-1 that is the same as a physical address PA2 corresponding to a physical page allocated to the privilege virtual machine group, the access request including the intermediate physical address IPA1-1 or the physical address PA2 from the normal virtual machine group may be blocked. Accordingly, computing system 200 may prevent data of a secure application executed in the privilege virtual machine group from being leaked to the normal virtual machine group.

Further, with respect to the second access request including the second intermediate physical address IPA2 generated in the privilege virtual machine group, the second intermediate physical address IPA2 may be used as a second physical address PA2 in physical address space 350 of memory device 240, and the hypervisor may control STG2 MMU 214 or hardware firewalls 260 and 270 to selectively block the second access request based on access permission information of the privilege virtual machine group for a physical page of memory device 240 having the second physical address PA2. Thus, the hypervisor may control STG2 MMU 214 or hardware firewalls 260 and 270 to block an access request from the privilege virtual machine group which includes a physical address corresponding to a physical page of memory device 240 that is allocated to the normal virtual machine group. Accordingly, computing system 200 may prevent the secure application executed in the privilege virtual machine group from unintentionally or erroneously writing data into the physical page of memory device 240 allocated to the normal virtual machine group.

Figure 4:
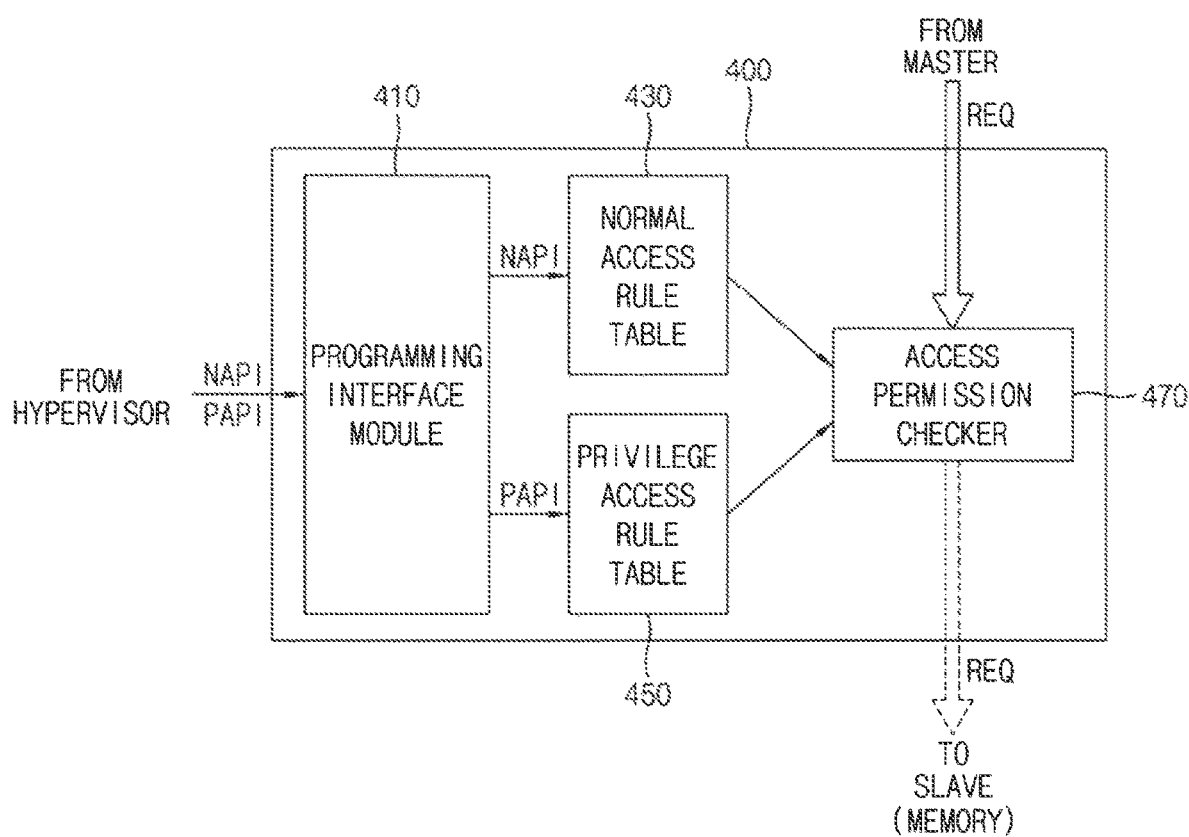
FIG. 4 is a block diagram illustrating a hardware firewall included in a computing system according to example embodiments.
Figure 5A:
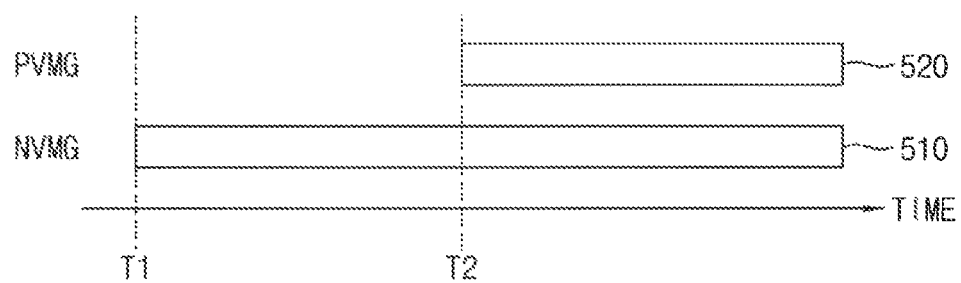
FIG. 5A and FIG. 5B are diagrams for describing example of time points at which a normal virtual machine group and a privilege virtual machine group are generated.
Figure 5B:
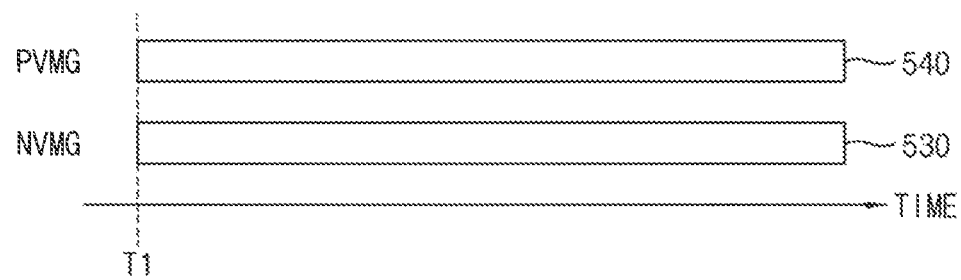
Figure 6C:
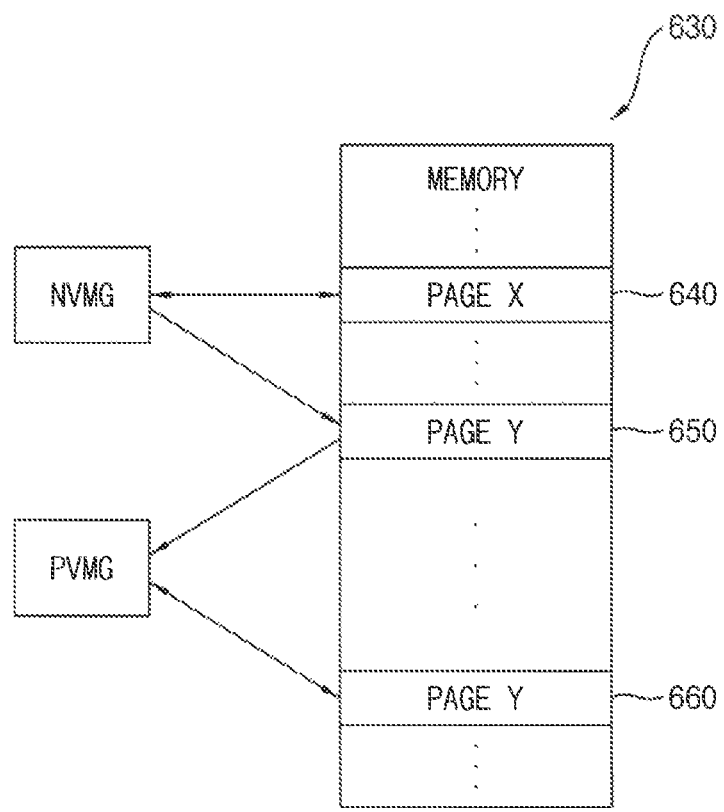
FIG. 6C is a diagram illustrating a memory device accessed by a normal virtual machine group and a privilege virtual machine group according to the examples of the access rule tables in FIGS. 6A and 6B.

FIG. 4 is a block diagram illustrating a hardware firewall included in a computing system according to example embodiments, FIGS. 5A and 5B are diagrams for describing example of time points at which a normal virtual machine group and a privilege virtual machine group are generated, FIG. 6A is a diagram illustrating an example of a normal access rule table included in a hardware firewall of FIG. 4, FIG. 6B is a diagram illustrating an example of a privilege access rule table included in a hardware firewall of FIG. 4, and FIG. 6C is a diagram illustrating a memory device accessed by a normal virtual machine group and a privilege virtual machine group according to the examples of the access rule tables in FIGS. 6A and 6B.

A hardware firewall 400 of FIG. 4 may be a hardware firewall 260 connected to a device 220 in FIG. 2, or may be a hardware firewall 270 connected to a device 230 in FIG. 2. Hardware firewall 400 may be implemented as a hardware (structure, device, module, block, unit, etc.) between a memory device 240 in FIG. 2 and a master (e.g., device 220 or device 230 operating as a master for a memory device 240 in FIG. 2) outputting an access request REQ for memory device 240. Hardware firewall 400 may store normal access permission information of a normal virtual machine group for respective ones of a plurality of physical pages of a memory device, and privilege access permission information of a privilege virtual machine group for the respective ones of the plurality of physical pages of the memory device. Hardware firewall 400 may selectively block the access request REQ based on at least one of the normal access permission information, the privilege access permission information, and whether the access request REQ is generated in the normal virtual machine group or the privilege virtual machine group. Since the selective blocking of the access request REQ is performed by hardware firewall 400 implemented as hardware, the security may be enhanced and the management and the selective blocking of the access request REQ may be performed more rapidly compared with a computing system where the access request REQ is managed by a software. Hardware firewall 400 may perform the selective blocking of the access request REQ for each physical page, and thus may be referred to as "Per-Page-Fire-Wall (PPFW)".

Referring to FIG. 4, hardware firewall 400 may include a programming interface module 410, a normal access rule table 430, a privilege access rule table 450 and an access permission checker 470.

Programming interface module 410 may receive, from a hypervisor, a command, such as an on/off command, a write command for normal access permission information NAPI, a write command for privilege access permission information PAPI, etc. Normal access rule table 430 may store the normal access permission information NAPI indicating whether the normal virtual machine group is permitted to access the respective ones of the plurality of physical pages. Privilege access rule table 450 may store the privilege access permission information PAPI indicating whether the privilege virtual machine group is permitted to access the respective ones of the plurality of physical pages. In some example embodiments, privilege access rule table 450 may be implemented with one table for the privilege virtual machine group. In other example embodiments, privilege access rule table 450 may be implemented with one or more tables respectively for one or more privilege virtual machines in the privilege virtual machine group. In this case, hardware firewall 400 may store the privilege access permission information PAPI per each privilege virtual machine. Normal access rule table 430 may be generated by receiving the normal access permission information NAPI from the hypervisor through programming interface module 410, and privilege access rule table 450 may be generated by receiving the privilege access permission information PAPI from the hypervisor through programming interface module 410. Access permission checker 470 may determine whether the access request REQ is for a physical page permitted to be accessed by referring to normal access rule table 430 or privilege access rule table 450. Access permission checker 470 may selectively block the access request REQ by referring to normal access rule table 430 in a case where the access request REQ is generated in the normal virtual machine group, and may selectively block the access request REQ by referring to privilege access rule table 450 in a case where the access request REQ is generated in the privilege virtual machine group.

According to example embodiments, normal access rule table 430 and privilege access rule table 450 may be generated at various timings. In some example embodiments, as illustrated in FIG. 5A, the normal virtual machine group NVMG may be generated at a time point T1 when the computing system is booted, and the privilege virtual machine group PVMG may be generated at a later time point T2 when an execution of a secure application is requested while the normal virtual machine group NVMG operates. Further, in some example embodiments, normal access rule table 430 and privilege access rule table 450 may be generated at the time point T2 when the privilege virtual machine group PVMG is generated via programming interface module 410. In other example embodiments, normal access rule table 430 may be generated at the time point T1 when the normal virtual machine group NVMG is generated, and privilege access rule table 450 may be generated at the time point T2 when the privilege virtual machine group PVMG is generated. In this case, normal access rule table 430 may be updated at the time point T2 when privilege access rule table 450 is generated. In still other example embodiments, as illustrated in FIG. 5B, at the time point T1 when the computing system is booted, the normal virtual machine group NVMG and the privilege virtual machine group PVMG both may be generated, and normal access rule table 430 and privilege access rule table 450 may be generated.

In some example embodiments, as illustrated in FIG. 6A, normal access rule table 610 may include a page index PI for respective ones of the plurality of physical pages, read access permission information RAPI of the normal virtual machine group indicating whether the normal virtual machine group is permitted to read data from the respective ones of the plurality of physical pages, and write access permission information WAPI of the normal virtual machine group indicating whether the normal virtual machine group is permitted to write data into the respective ones of the plurality of physical pages. In an example illustrated in FIG. 6A, normal access rule table 610 indicates that read and write accesses each are permitted for the normal virtual machine group with respect to a 'page X', that a write access is permitted but a read access is not permitted for the normal virtual machine group with respect to a 'page Y', and that read and write accesses each are not permitted for the normal virtual machine group with respect to a 'page Z'.

Further, as illustrated in FIG. 6B, privilege access rule table 620 may include a page index PI for respective ones of the plurality of physical pages, read access permission information RAPI of the privilege virtual machine group indicating whether the privilege virtual machine group is permitted to read data from the respective ones of the plurality of physical pages, and write access permission information WAPI of the privilege virtual machine group indicating whether the privilege virtual machine group is permitted to write data into the respective ones of the plurality of physical pages. In an example illustrated in FIG. 6B, privilege access rule table 620 indicates that read and write accesses each are not permitted for the privilege virtual machine group with respect to the 'page X', that a write access is not permitted but a read access is permitted for the privilege virtual machine group with respect to the 'page Y', and that read and write accesses each are permitted for the privilege virtual machine group with respect to the 'page Z'.

Thus, as illustrated in FIG. 6C, in a case where hardware firewall 400 includes normal access rule table 610 and privilege access rule table 620 illustrated in FIGS. 6A and 6B, hardware firewall 400 may not block read and write access requests for 'page X' 640 and a write access request for 'page Y' 650 from the normal virtual machine group NVMG. However, hardware firewall 400 may block a read access request for 'page Y' 650 and read and write access requests for 'page Z' 660 from the normal virtual machine group NVMG. Further, hardware firewall 400 may not block a read access request for 'page Y' 650 and read and write access requests for 'page Z' 660 from the privilege virtual machine group PVMG. However, hardware firewall 400 may block read and write access requests for 'page X' 640 and a write access request for 'page Y' 650 from the privilege virtual machine group PVMG. However, the present inventive concepts may not be limited to the examples illustrated in FIGS. 6A through 6C. For example, although FIG. 6B illustrates an example where privilege access rule table 620 is implemented as one table for the privilege virtual machine group PVMG, in other example embodiments, privilege access rule table 620 may be implemented as one or more tables respectively corresponding to one or more privilege virtual machines included in the privilege virtual machine group PVMG.

FIG. 7 is a block diagram illustrating a portion of a computing system according to example embodiments, FIG. 8 is a block diagram illustrating a hardware privilege generator included in a computing system according to example embodiments, and FIG. 9 is a diagram illustrating an example of a context table included in a hardware privilege generator of FIG. 8.

Referring to FIG. 7, a computing system 700 may include a plurality of masters 710, 720, 730 and 740 that output access requests for a slave, for example a memory device. For example, plurality of masters 710, 720, 730 and 740 may correspond to at least one device 220 and 230 illustrated in FIG. 2. In some example embodiments, respective masters 710, 720, 730 and 740 may have different port identifications (PORT IDs). For example, a first master 710 may have a PORT ID of '0x0', a second master 720 may have a PORT ID of '0x1', a third master 730 may have a PORT ID of '0x2', and a fourth master 740 may have a PORT ID of '0x3'.

Computing system 700 may further include a hardware privilege generator 760 implemented as a hardware (structure, device, module, block, unit, etc.) between plurality of masters 710, 720, 730 and 740 and a hardware firewall 780. Since hardware privilege generator 760 is implemented as hardware, the security may be enhanced, and operations may be rapidly performed. When one of the plurality of masters 710, 720, 730 and 740 outputs an access request for a slave (e.g., the memory device), the access request may be transferred to hardware privilege generator 760 through an interconnect 750. Hardware privilege generator 760 may: receive the access request from the one master through interconnect 750; append, to the access request, privilege information indicating whether the access request is generated by a normal virtual machine group or a privilege virtual machine group; and output the access request to which the privilege information is appended.

To perform this operation, as illustrated in FIG. 8, hardware privilege generator 760 may include a programming interface module 762, a context table 764 and a privilege generation module 766. Programming interface module 762 may receive, from a hypervisor, a command, such as an on/off command, a context write command, etc. Context table 764 may store an operation mode for the access request REQ which depends on the master outputting the access request REQ. Contexts including the operation modes may be written from the hypervisor into context table 764 via programming interface module 762. Privilege generation module 766 may append the privilege information to the access request REQ by referring to context table 764, and may output the access request REQ (WITH PI) to which the privilege information is appended.

In some example embodiments, as illustrated in FIG. 9, context table 764 may include a context index CI for at least one context stored in context table 764, a matching mask MM that is used in bit-wise masking for a request identification (ID) included in the access request REQ, a matching value MV that is bit-wise matched with the request ID on which the bit-wise masking is performed, and the operation mode OPMODE for the access request REQ including the request ID that is bit-wise matched with the matching value MV.

For example, in some example embodiments, once one master of the plurality of masters 710, 720, 730 and 740 outputs the access request REQ, interconnect 750 may append the PORT ID of the one master to the end of the request ID of the access request REQ to indicate which one of the plurality of masters 710, 720, 730 and 740 outputs the access request REQ. Thus, in the example illustrated in FIGS. 7 through 9, the last two digits of the access request REQ received by hardware privilege generator 760 may be the PORT ID of the one master that outputs the access request REQ. Once hardware privilege generator 760 including context table 764 of FIG. 9 receives the access request REQ from the one master of the plurality of masters 710, 720, 730 and 740 via interconnect 750, hardware privilege generator 760 may perform the bit-wise masking with the matching mask MM on the request ID of the access request REQ. In some example embodiments, a context including the matching mask MM having a value of '0x0' may be a non-activated or disabled context, and this context may not be considered (or may be disregarded). Further, hardware privilege generator 760 may perform the bit-wise matching with the matching value MV on the request ID on which the bit-wise masking is performed, and may search a context including the matching value MV that is bit-wise matched with the request ID.

In the example illustrated in FIGS. 7 through 9, the access request REQ output from first master 710 having the PORT ID of '0x0' may be matched with a context having the context index CI of '1', and hardware privilege generator 760 may perform an operation corresponding to the operation mode OPMODE of 'NOT_OVERRIDE' on the access request REQ from first master 710. In some example embodiments, 'NOT_OVERRIDE' may represent that the privilege information is not appended to the access request REQ. In this case, first master 710 may output the access request REQ with the privilege information by previously appending the privilege information to the access request REQ before outputting the access request REQ, and hardware privilege generator 760 may not perform a particular operation on the access request REQ according to the operation mode OPMODE of 'NOT_OVERRIDE'. The access request REQ output from second master 720 having the PORT ID of '0x1' may not be matched with any context in context table 764, and, in this case, hardware privilege generator 760 may perform a default operation on the access request REQ. The access request REQ output from third master 730 having the PORT ID of '0x2' may be matched with a context having the context index CI of '4', and hardware privilege generator 760 may perform an operation corresponding to the operation mode OPMODE of 'OVERRIDE_NORMAL' on the access request REQ from third master 730. For example, 'OVERRIDE_NORMAL' may represent that the privilege information indicating the normal virtual machine group is appended to the access request REQ. Third master 730 may be a master that is controlled by the normal virtual machine group, and hardware privilege generator 760 may append the privilege information indicating the normal virtual machine group to the access request REQ from third master 730 according to the operation mode OPMODE of 'OVERRIDE_NORMAL'. The access request REQ output from fourth master 740 having the PORT ID of '0x3' may be matched with a context having the context index CI of '3', and hardware privilege generator 760 may perform an operation corresponding to the operation mode OPMODE of 'OVERRIDE_PRIVILEGE on the access request REQ from fourth master 740. For example, 'OVERRIDE_PRIVILEGE' may represent that the privilege information indicating the privilege virtual machine group is appended to the access request REQ. Fourth master 740 may be a master that is controlled by the privilege virtual machine group, and hardware privilege generator 760 may append the privilege information indicating the privilege virtual machine group to the access request REQ from fourth master 740 according to the operation mode OPMODE of 'OVERRIDE_PRIVILEGE'.

A virtual address included in the access request REQ (WITH PI) to which the privilege information is appended by hardware privilege generator 760 may be translated into an intermediate physical address (that is used as a physical address) by a STG1 MMU 770, and the access request REQ (WITH PI) including the intermediate physical address may be provided to hardware firewall 780. Hardware firewall 780 may be informed of which one of the normal virtual machine group or the privilege virtual machine group generates the access request REQ based on the privilege information. Hardware firewall 780 may selectively block the access request REQ by referring to a normal access rule table when the access request REQ is generated in the normal virtual machine group, and may selectively block the access request REQ by referring to a privilege access rule table when the access request REQ is generated in the privilege virtual machine group.

Figure 10:
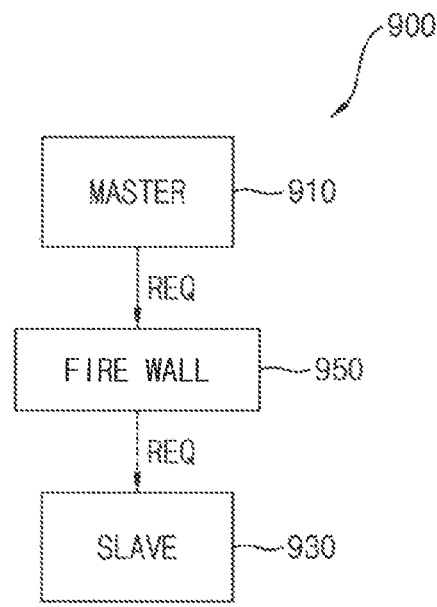
FIG. 10 is a block diagram illustrating a portion of a computing system according to example embodiments.

FIG. 10 is a block diagram illustrating a portion of a computing system according to example embodiments.

Referring to FIG. 10, a hardware firewall 950 may be located not only between a plurality of masters 710, 720, 730 and 740 and a slave as illustrated in FIG. 7, but also at a one-to-one communication chancel between one master 910 and one slave 930 (e.g., a memory device or any hardware resource). Master 910 may output an access request REQ for slave 930. Hardware firewall 950 may store access permission information of master 910 for slave 930, and may selectively block the access request REQ based on the access permission information.

Figure 11:
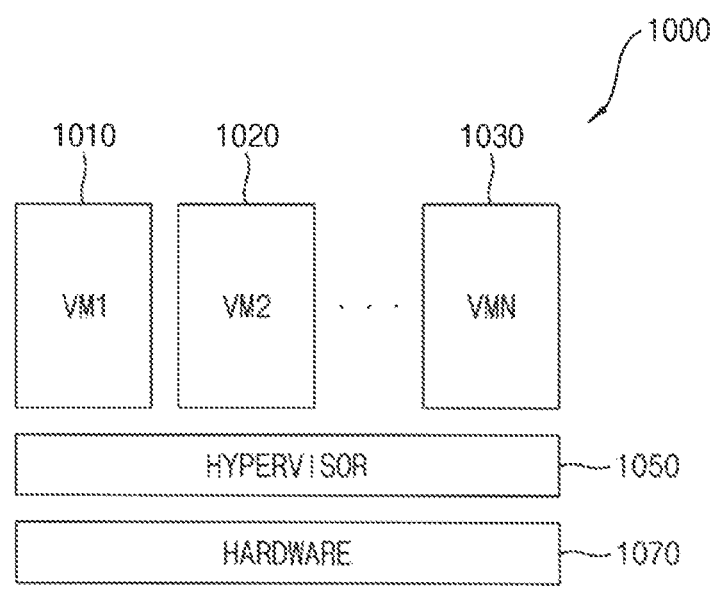
FIG. 11 is a block diagram for describing a software architecture of a computing system according to example embodiments.
Figure 12:
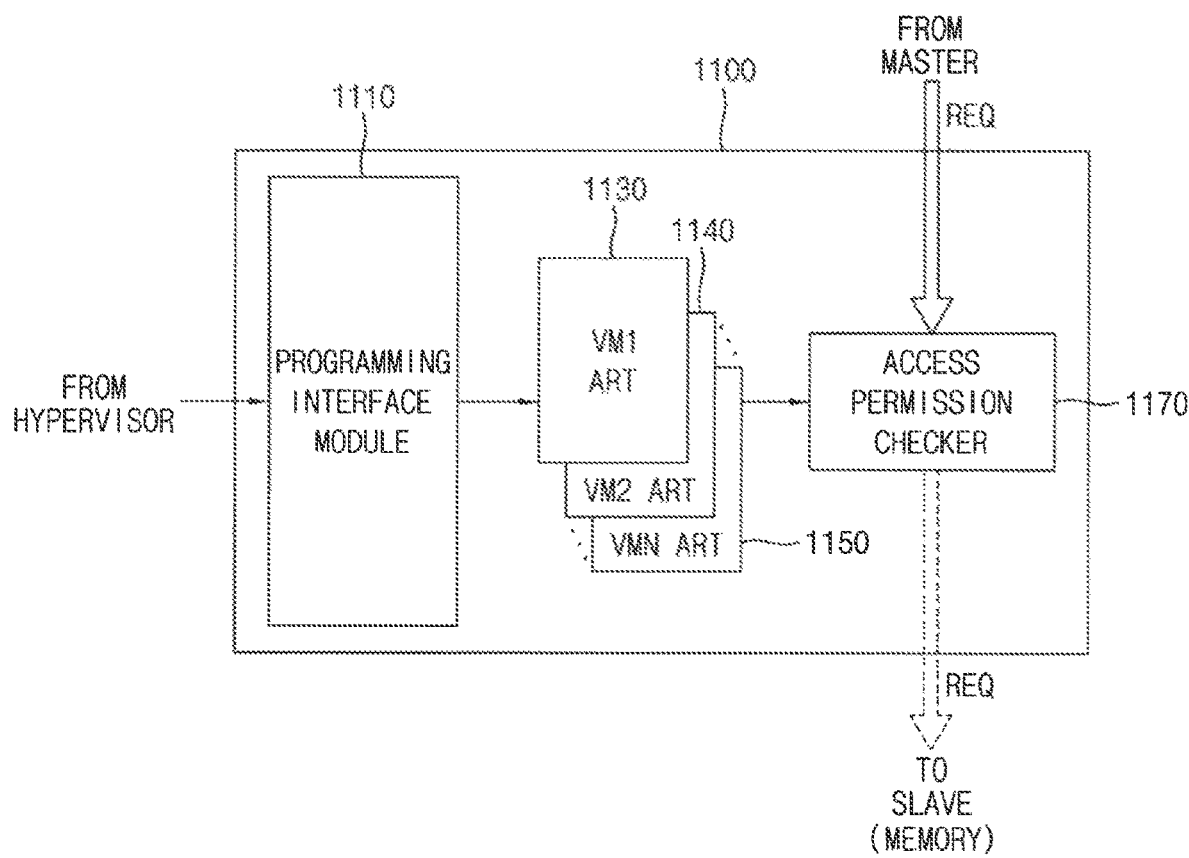
FIG. 12 is a block diagram illustrating a hardware firewall included in a computing system according to example embodiments.
Figure 13:
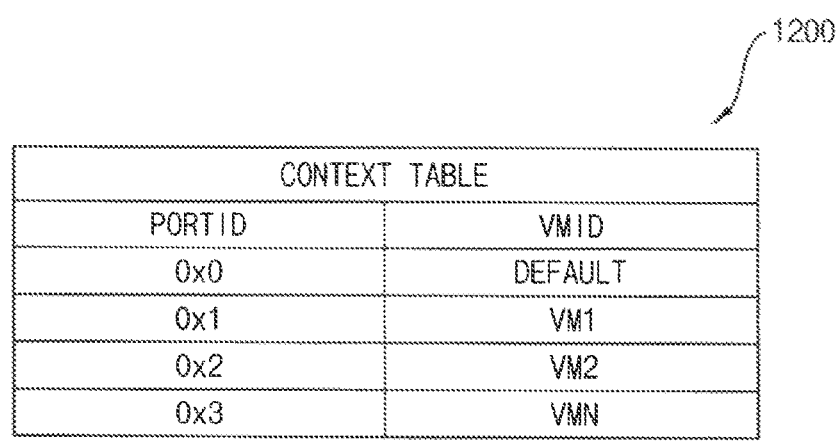
FIG. 13 is a diagram illustrating an example of a context table of a hardware privilege generator included in a computing system according to example embodiments.

FIG. 11 is a block diagram for describing a software architecture of a computing system according to example embodiments, FIG. 12 is a block diagram illustrating a hardware firewall included in a computing system according to example embodiments, and FIG. 13 is a diagram illustrating an example of a context table of a hardware privilege generator included in a computing system according to example embodiments.

Referring to FIG. 11, in a computing system 1000, a plurality of virtual machines 1010, 1020 and 1030 in which a plurality of operating systems are respectively executed may be operated, and a hypervisor 1050 that controls accesses for a hardware 1070 requested by the plurality of virtual machines 1010, 1020 and 1030. In computing system 1000, a normal application may be executed in at least first one of the plurality of virtual machines 1010, 1020 and 1030, a secure application may be executed in at least second one of the plurality of virtual machines 1010, 1020 and 1030, and an access request for at least one hardware resource (e.g., a physical memory page) allocated to the second one of the plurality of virtual machines 1010, 1020 and 1030 may be blocked when the access request is generated in the first one of the plurality of virtual machines 1010, 1020 and 1030. To achieve this blocking, computing system 1000 may include a hardware firewall 1100 of FIG. 12 located between a master outputting the access request and a corresponding slave (e.g., a memory device).

Referring to FIG. 12, hardware firewall 1100 may include a programming interface module 1110, a plurality of access rule tables (ARTs) 1130, 1140 and 1150 respectively corresponding to the plurality of virtual machines 1010, 1020 and 1030, and an access permission checker 1170. Hardware firewall 1100 may have a configuration and an operation similar to those of a hardware firewall 400 of FIG. 4, except that hardware firewall 1100 may include the plurality of access rule tables 1130, 1140 and 1150 respectively corresponding to the plurality of virtual machines 1010, 1020 and 1030 instead of a normal access rule table 430 and a privilege access rule table 450 illustrated in FIG. 4. Each access rule table 1130, 1140 and 1150 may store access permission information of a corresponding one of the plurality of virtual machines 1010, 1020 and 1030 for a plurality of physical pages of a memory device. In some example embodiments, a hardware privilege generator may append, to the access request, information indicating which one of the plurality of virtual machines 1010, 1020 and 1030 generates the access request. Hardware firewall 1100 may receive, from the hardware privilege generator, the access request to which the information is appended, and may refer to one of the plurality of access rule tables 1130, 1140 and 1150 corresponding to the virtual machine indicated by the appended information. In some example embodiments, the hardware privilege generator may include a context table 1200 of FIG. 13 instead of a context table 764 of FIG. 9. Context table 1200 may include a PORT ID and a virtual machine identification (VMID). To indicate which one of the plurality of virtual machines 1010, 1020 and 1030 generates the access request REQ, the hardware privilege generator may append, to the access request REQ, the VMID corresponding to the PORT ID using context table 1200.

Figure 14:
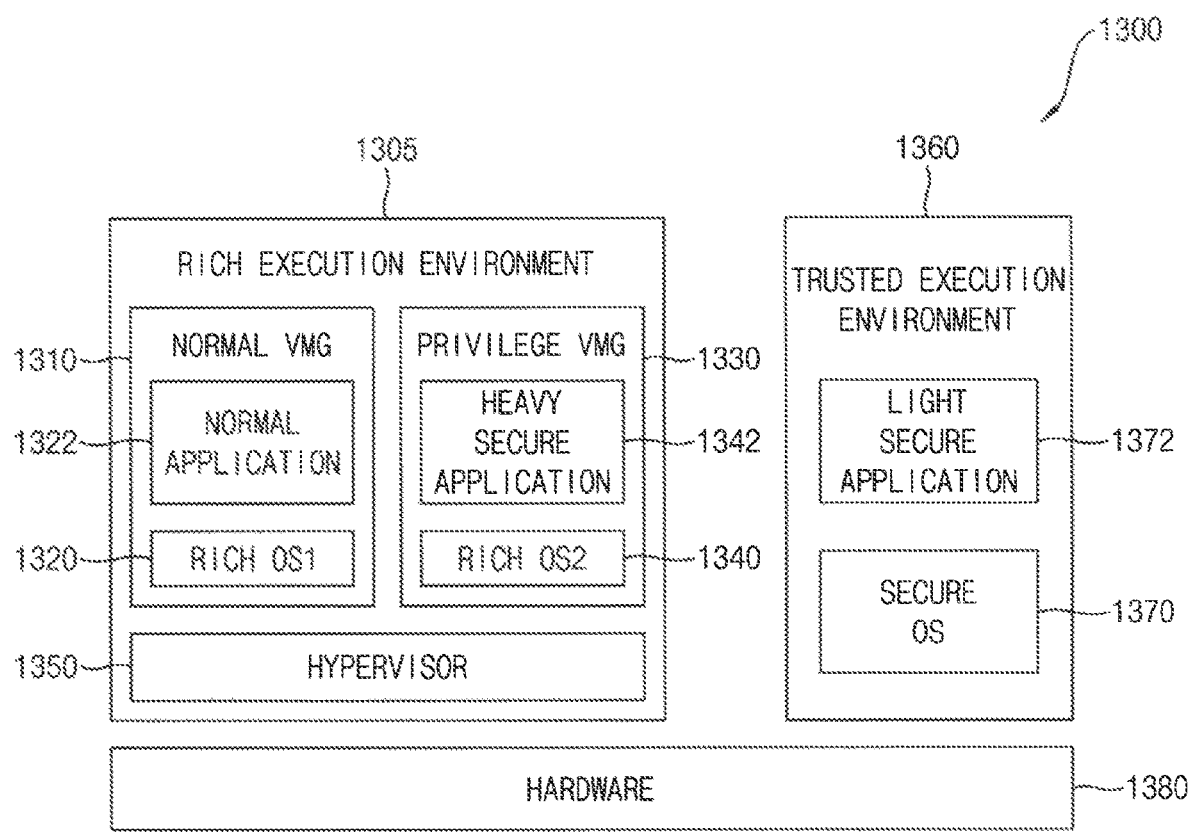
FIG. 14 is a block diagram for describing a software architecture of a computing system according to example embodiments.

FIG. 14 is a block diagram for describing a software architecture of a computing system according to example embodiments.

Referring to FIG. 14, a computing system 1300 may provide a rich execution environment (REE) 1305 and a trusted execution environment (TEE) 1360.

In REE 1305, a processor of computing system 1300 may operate a plurality of virtual machines in which a plurality of rich operating systems 1320 and 1340 are respectively executed. Further, in REE 1305, the processor of computing system 1300 may execute a hypervisor 1350 that groups the plurality of virtual machines into a normal virtual machine group 1310 and a privilege virtual machine group 1330, and that controls hardware accesses requested by normal virtual machine group 1310 and privilege virtual machine group 1330. The processor of computing system 1300 may execute a secure operating system 1370 in TEE 1360.

In computing system 1300, a first secure application 1372 may be executed in TEE 1360, a normal application 1322 may be executed in normal virtual machine group 1310 of REE 1305, and a second secure application 1342 that requires a data throughput greater than a data throughput required by first secure application 1372 may be executed in privilege virtual machine group 1330 of REE 1305. Thus, light secure application 1372 that requires a relatively small data throughput may be executed in TEE 1360, and heavy secure application 1342 that requires a relatively large data throughput may be executed in privilege virtual machine group 1330 of REE 1305.

The inventive concept may be applied to any computing system requiring an execution of a secure application. For example, the inventive concept may be applied to a smart phone, a mobile phone, a tablet computer, a laptop computer, a personal computer, an MP3 player, a PDA, a PMP, a digital TV, a digital camera, portable game console, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A computing system, comprising:
   a processor,
       wherein the processor is configured to operate a plurality of virtual machines in which a plurality of operating systems are respectively executed,
       wherein the processor is further configured to execute a hypervisor that groups the plurality of virtual machines into a normal virtual machine group and a privilege virtual machine group, and that controls hardware accesses requested by the normal virtual machine group and the privilege virtual machine group, and
       wherein the processor is further configured to execute a normal application in the normal virtual machine group, and to execute a secure application in the privilege virtual machine group;
   a memory device including a plurality of physical pages;
   a master configured to output an access request for the memory device;
   a hardware firewall between the master and the memory device, the hardware firewall configured to store normal access permission information of the normal virtual machine group for the plurality of physical pages and to store privilege access permission information of the privilege virtual machine group for the plurality of physical pages, and to selectively block the access request based on at least one of the normal access permission information, the privilege access permission information, and whether the access request is generated in the normal virtual machine group or the privilege virtual machine group; and a hardware privilege generator between the master and the hardware firewall, the hardware privilege generator configured: to receive the access request from the master, to append to the access request privilege information indicating whether the access request is generated by the normal virtual machine group or the privilege virtual machine group, and to output the access request to which the privilege information is appended.

2. The computing system of claim 1, wherein the hypervisor is configured to selectively block a hardware access request generated in the normal virtual machine group such that at least one hardware resource allocated to the privilege virtual machine group is not accessed by the normal virtual machine group.

3. The computing system of claim 1,
wherein the hypervisor is configured to selectively block an access request for the memory device generated in the normal virtual machine group such that at least one of the plurality of physical pages allocated to the privilege virtual machine group is not accessed by the normal virtual machine group.

4. The computing system of claim 1,
wherein, with respect to a first access request for the memory device which is generated in the normal virtual machine group and includes a first virtual address in a first virtual address space, the normal virtual machine group is configured to translate the first virtual address into a first intermediate physical address in a first intermediate physical address space, wherein, with respect to a second access request for the memory device which is generated in the privilege virtual machine group and includes a second virtual address in a second virtual address space, the privilege virtual machine group is configured to translate the second virtual address into a second intermediate physical address in a second intermediate physical address space, and wherein each of the first intermediate physical address space and the second intermediate physical address space is the same as a physical address space of the memory device.

5. The computing system of claim 4, wherein the hypervisor is configured to: receive the first access request including the first intermediate physical address from the normal virtual machine group; use the first intermediate physical address as a first physical address in the physical address space of the memory device without an address translation for the first intermediate physical address; and selectively block the first access request based on access permission information of the normal virtual machine group for a physical page of the memory device having the first physical address.

6. The computing system of claim 4, wherein the hypervisor is configured to: receive the second access request including the second intermediate physical address from the privilege virtual machine group; use the second intermediate physical address as a second physical address in the physical address space of the memory device without an address translation for the second intermediate physical address; and selectively block the second access request based on access permission information of the privilege virtual machine group for a physical page of the memory device having the second physical address.

7. The computing system of claim 1, wherein the hardware firewall comprises:
a programming interface module configured to receive a command from the hypervisor;
a normal access rule table configured to store the normal access permission information indicating whether the normal virtual machine group is permitted to access respective ones of the plurality of physical pages;
a privilege access rule table configured to store the privilege access permission information indicating whether the privilege virtual machine group is permitted to access the respective ones of the plurality of physical pages; and
an access permission checker configured to selectively block the access request by referring to the normal access rule table when the access request is generated in the normal virtual machine group, and to selectively block the access request by referring to the privilege access rule table when the access request is generated in the privilege virtual machine group.

8. The computing system of claim 7, wherein the normal access rule table comprises:
a page index for the respective ones of the plurality of physical pages;
read access permission information indicating whether the normal virtual machine group is permitted to read data from the respective ones of the plurality of physical pages; and
write access permission information indicating whether the normal virtual machine group is permitted to write data into the respective ones of the plurality of physical pages.

9. The computing system of claim 7, wherein the privilege access rule table comprises:
a page index for the respective ones of the plurality of physical pages;
read access permission information indicating whether the privilege virtual machine group is permitted to read data from the respective ones of the plurality of physical pages; and
write access permission information indicating whether the privilege virtual machine group is permitted to write data into the respective ones of the plurality of physical pages.

10. The computing system of claim 7, wherein, while the normal virtual machine group operates, the privilege virtual machine group is generated when an execution of the secure application is requested, and
wherein the normal access rule table and the privilege access rule table are generated by the hypervisor via the programming interface module when the privilege virtual machine group is generated.

11. The computing system of claim 7, wherein, when the computing system is booted, the normal virtual machine group and the normal access rule table are generated, and
wherein, when an execution of the secure application is requested, the privilege virtual machine group and the privilege access rule table are generated, and the normal access rule table is updated.

12. The computing system of claim 7, wherein, when the computing system is booted, the normal virtual machine group, the privilege virtual machine group, the normal access rule table and the privilege access rule table are generated.

13. The computing system of claim 1, wherein the hardware privilege generator comprises:
   a programming interface module for receiving a command from the hypervisor;
   a context table configured to store an operation mode for the access request depending on the master outputting the access request; and
   a privilege generation module configured to append the privilege information to the access request by referring to the context table.

14. The computing system of claim 13, wherein the context table comprises:
   a context index for at least one context stored in the context table;
   a matching mask that is used in bit-wise masking for a request ID included in the access request;
   a matching value that is bit-wise matched with the request ID on which the bit-wise masking is performed; and
   the operation mode for the access request including the request ID that is bit-wise matched with the matching value.

15. A computing system, comprising:
   a processor, wherein:
   the processor is configured to operate a plurality of virtual machines in which a plurality of operating systems are respectively executed,
   the processor is further configured to execute a hypervisor that controls hardware accesses requested by the plurality of virtual machines, and
   the processor is further configured to execute a normal application in a first one of the plurality of virtual machines, and to execute a secure application in a second one of the plurality of virtual machines;
   a memory device including a plurality of physical pages;
   a master configured to output an access request for the memory device;
   a hardware privilege generator configured to append, to the access request, information indicating whether the access request is generated by the normal virtual machine group or the privilege virtual machine group, and to output the access request to which the privilege information is appended; and
   a hardware firewall configured to store access permission information of respective ones of the plurality of virtual machines for respective ones of the plurality of physical pages, and to selectively block the access request based on the appended information and the access permission information.

16. A computing system comprising a processor and providing a rich execution environment (REE) and a trusted execution environment (TEE), wherein:
   the processor is configured to operate a plurality of virtual machines in which a plurality of rich operating systems are respectively executed in the REE, and to execute a secure operating system in the TEE,
   the processor is further configured to execute, in the REE, a hypervisor that groups the plurality of virtual machines into a normal virtual machine group and a privilege virtual machine group, and that controls hardware accesses requested by the normal virtual machine group and the privilege virtual machine group, and
   the processor is further configured to execute a first secure application in the TEE, to execute a normal application in the normal virtual machine group of the REE, and to execute a second secure application in the privilege virtual machine group of the REE, wherein the second secure application requires a data throughput greater than a data throughput required by the first secure application in the TEE.

17. The computing system of claim 16, wherein the hypervisor is configured to selectively block a hardware access request generated in the normal virtual machine group such that at least one hardware resource allocated to the privilege virtual machine group is not accessed by the normal virtual machine group.

18. The computing system of claim 16, further comprising a memory device including a plurality of physical pages,
   wherein the hypervisor is configured to selectively block an access request for the memory device generated in the normal virtual machine group such that at least one of the plurality of physical pages allocated to the privilege virtual machine group is not accessed by the normal virtual machine group.

19. The computing system of claim 16, further comprising a memory device,
   wherein, with respect to a first access request for the memory device which is generated in the normal virtual machine group and includes a first virtual address in a first virtual address space, the normal virtual machine group is configured to translate the first virtual address into a first intermediate physical address in a first intermediate physical address space,
   wherein, with respect to a second access request for the memory device which is generated in the privilege virtual machine group and includes a second virtual address in a second virtual address space, the privilege virtual machine group is configured to translate the second virtual address into a second intermediate physical address in a second intermediate physical address space, and
   wherein each of the first intermediate physical address space and the second intermediate physical address space is the same as a physical address space of the memory device.

20. The computing system of claim 19, wherein the hypervisor is configured to:
   receive the first access request including the first intermediate physical address from the normal virtual machine group;
   use the first intermediate physical address as a first physical address in the physical address space of the memory device without an address translation for the first intermediate physical address; and
   selectively block the first access request based on access permission information of the normal virtual machine group for a physical page of the memory device having the first physical address.

* * * * *